Dec. 19, 1950 W. D. SELLERS 2,534,479
HANDLE ACTUATED DELAYED MOTOR DISCONNECT
FOR SUCTION CLEANERS
Filed Dec. 29, 1944 5 Sheets-Sheet 2

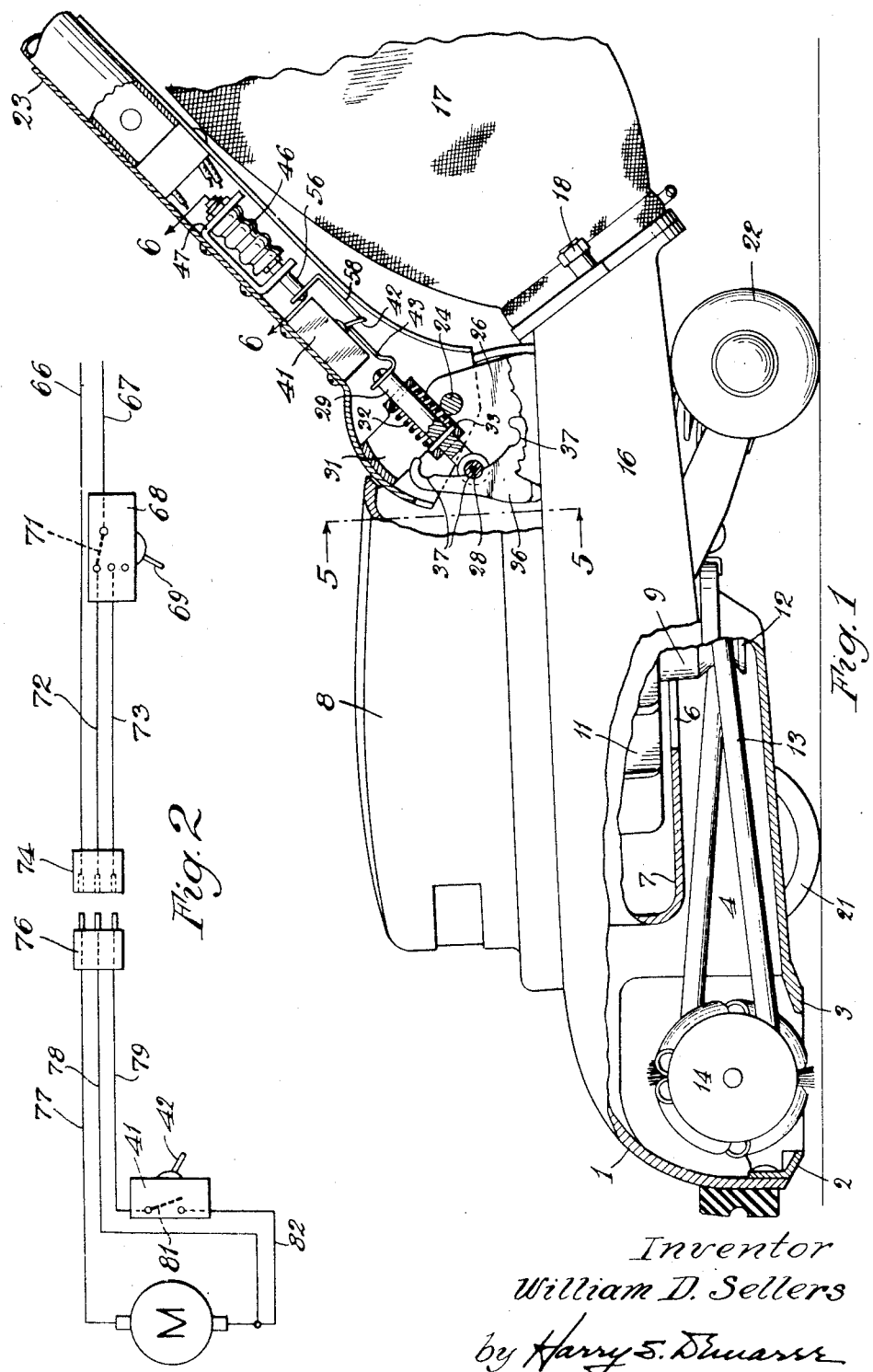

Inventor
William D. Sellers
by Harry S. Dunaur
Attorney

Dec. 19, 1950 W. D. SELLERS 2,534,479
HANDLE ACTUATED DELAYED MOTOR DISCONNECT
FOR SUCTION CLEANERS
Filed Dec. 29, 1944 5 Sheets-Sheet 3

Inventor
William D. Sellers
by Harry S. Bumser
Attorney.

Dec. 19, 1950 W. D. SELLERS 2,534,479
HANDLE ACTUATED DELAYED MOTOR DISCONNECT
FOR SUCTION CLEANERS
Filed Dec. 29, 1944 5 Sheets-Sheet 4

Inventor
William D. Sellers
by Harry S. Dumass
Attorney.

Dec. 19, 1950   W. D. SELLERS   2,534,479
HANDLE ACTUATED DELAYED MOTOR DISCONNECT
FOR SUCTION CLEANERS
Filed Dec. 29, 1944   5 Sheets-Sheet 5

Inventor
William D. Sellers
by Harry F. D[illegible]
Attorney

Patented Dec. 19, 1950

2,534,479

UNITED STATES PATENT OFFICE 2,534,479

HANDLE ACTUATED DELAYED MOTOR DISCONNECT FOR SUCTION CLEANERS

William D. Sellers, Glen Ellyn, Ill., assignor to The Hoover Company, North Canton, Ohio, a corporation of Ohio Application December 29, 1944, Serial No. 570,300

15 Claims. (Cl. 15—319)

The present invention relates to suction cleaners in general and particularly to a suction cleaner having automatically controlled suction-creating means. More specifically the invention comprises a new and novel suction cleaner in which the suction-creating means are automatically de-energized when the machine is not being used by the operator and which are automatically re-energized upon the operator returning to the use of the machine.

It is an object of the present invention to provide a new and improved suction cleaner. It is another object of the invention to provide a suction cleaner in which the suction-creating means are automatically de-energized upon the operator relinquishing control of the cleaner. A still further object of the invention is to provide a suction cleaner which is automatically turned off, after a predetermined time interval, when the operator ceases to operate the machine. A further object of the invention is to de-energize the suction-creating means and the surface-agitating means upon the operator ceasing to operate the machine, and following a time delay period, and without positive action upon the part of the operator to effect that result. Still another object of the invention is to provide a suction cleaner in which the cleaner motor is de-energized electrically after a predetermined time interval subsequent to the operator's relinquishing control thereof, and as a direct but unintentional result of the absence of control. These and other more specific objects will appear upon reading the following specification and claims and upon considering in connection therewith the attached drawings to which they relate.

Referring now to the drawings in which three preferred embodiments of the invention are illustrated, and in which the same reference characters refer to the same parts throughout:

Figure 1 is a side view of a suction cleaner constructed in accordance with the present invention with certain parts broken away and shown in section, the cleaner handle being resistingly retained in an "at rest" position, the automatic control parts being positioned in their cleaner-de-energized relationship;

Figure 2 is a diagrammatic showing of the electrical circuit of the cleaner illustrated in Figure 1;

Figures 3, 4:
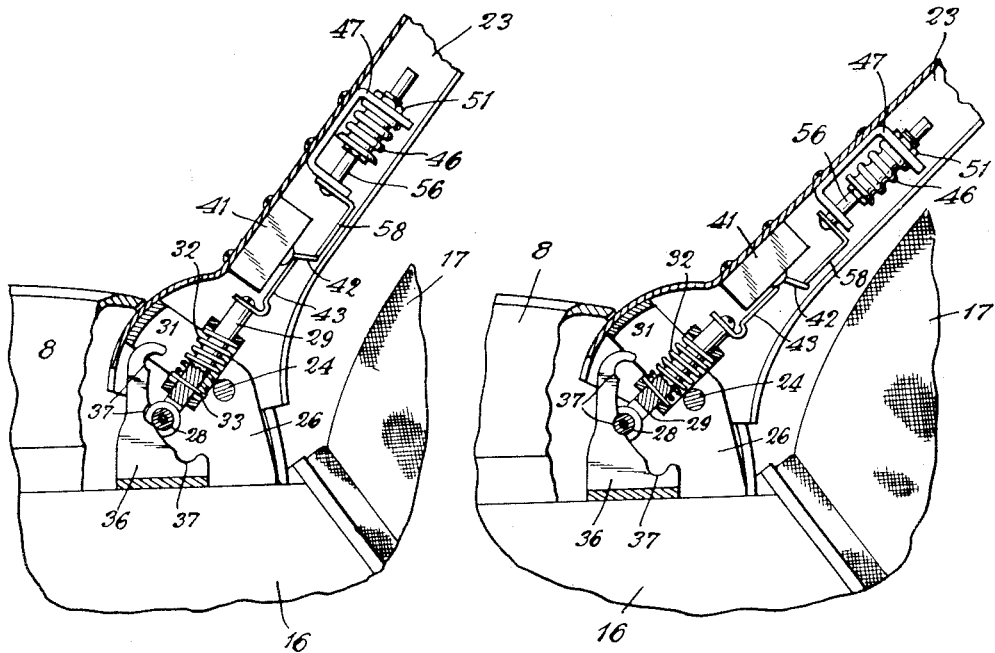
Figure 3 is a partial view of the mechanism illustrated in Figure 1 with the control positioned as during cleaner operation.
Figure 4 is a view similar to Figure 3 with the handle in an "at rest" position and at the beginning of the time delay period which precedes the de-energization of the cleaner.
Figures 5, 6:
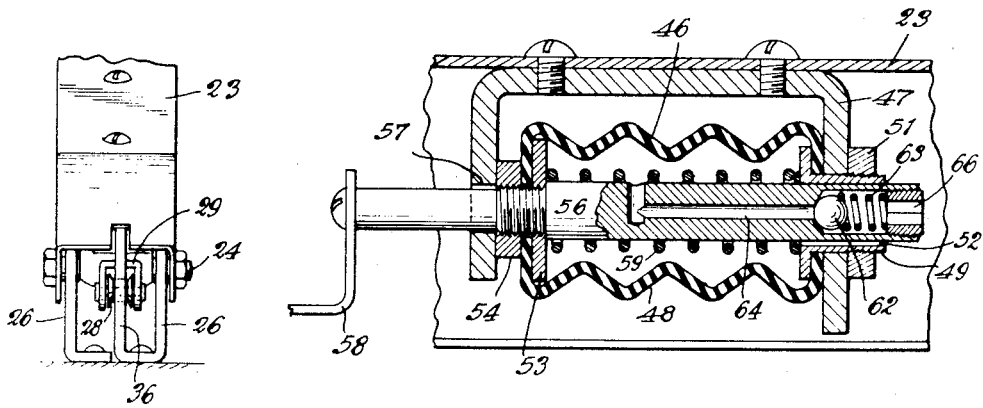
Figure 5 is a view looking in the direction of the arrows upon the line 5—5 of Figure 1 and shows the fixed sector and the handle-carried spring-pressed detent which cooperates therewith to control the handle position.
Figure 6 is a section upon the line 6—6 of Figure 1 and shows the expansible bellows which comprises the time delay mechanism in section.

In suction cleaners of the on-the-floor cleaning type the cleaner is propelled over the surface covering being cleaned by an operator-provided propelling force exerted through the cleaner handle which is usually pivoted to the cleaner body. During cleaner use the suction-creating means are actuated as are the surface-agitating means. Foreign material is dislodged from the surface covering being cleaned, is removed therefrom by a flow of cleaning air which passes into and through the cleaner, and is finally removed from that air by a dirt separator such as a dust bag.

Experience teaches that in the use of a suction cleaner there are many instances in which the operator leaves the cleaner temporarily for any one of many reasons. He may find it desirable to move an article of furniture in order to clean the surface thereunder and in such a case intends to return to the cleaner immediately and does not wish it turned off. In other cases the operator leaves the machine with the initial intent to return immediately but fails to do so. In the first type of case it is desirable that the machine continue to operate and remain in condition for instantaneous continuance of cleaner use. In the second type of case it is just as desirable that the cleaner be rendered inoperative in order that electricity will not be wasted and, further, in order that all possibility of injury to an underlying surface covering be entirely eliminated. The present invention is intended to provide a construction in which the operator may leave the cleaner for a limited time period and return to find it still in operation. It is also intended to provide a construction in which, should the machine be left for longer than the predetermined time period, the machine will automatically turn itself off without attention from the operator. The invention is also characterized in that upon the operator returning to the cleaner and resuming operation the machine automatically re-energizes itself.

The characteristics of operation of the present invention are obtained by the use of a mechanism which is automatically operative as an incident to the operator's use or non-use of the cleaner. It is not necessary for the operator to actuate a switch although the usual circuit-controlling switch is provided for the initiation of cleaner use and for its final termination and also to establish a circuit independent of the aforementioned automatic control in order to enable the cleaner to be used with dusting tools for off-the-floor cleaning.

According to the present invention suction-creating means and the surface-agitating means are automatically rendered inoperative by the de-energization of the cleaner motor whenever the cleaner handle is positioned in an "at rest" position and remains there for longer than a predetermined time interval. In cleaner operation the propelling handle usually moves through certain ranges of movement. Should the operator release the handle in a range of movement the handle automatically moves to an "at rest" position. Additionally the handle is in an "at rest" position when extended vertically, as for storage purposes. The exact angular position of the handle in an "at rest" position is not of the essence, it being understood that the position or positions should be so related to the angular movement of the handle that the handle can be moved thereinto at will.

Referring again to the drawings, and to Figures 1 to 6 inclusive in particular, the first preferred embodiment of the invention is illustrated. The cleaner is seen to comprise a body including a nozzle 1 having surface-contacting front and rear lips 2 and 3, respectively, an air passageway 4 extending from the nozzle to the eye 6 of a fan chamber 7. Immediately above the fan chamber 7 is a motor housing 8 which houses an unshown driving motor, the shaft 9 of which extends downwardly through the fan chamber 7 where it carries the suction-creating fan 11. The shaft 9 extends through chamber 7 into the air passageway 4 to be formed as a pulley 12. A power-transmitting belt 13 seats upon pulley 12 and extends forwardly within the passageway 4 to drive a rotary agitator 14 of the usual type including rigid beater elements and flexible brush elements and which is adapted to contact a surface covering undergoing cleaning between the nozzle lips 2 and 3.

An exhaust passageway 16 extends rearwardly from the fan chamber 7 and through it the dirt-carrying air stream from the nozzle 1 is exhausted by the suction-creating fan 11 into a dust bag 17 which is removably attached, as by means 18. As in the usual suction cleaner front and rear supporting wheels 21 and 22, respectively, are provided by which the machine is made readily movable over a surface covering undergoing cleaning. Also, there is provided an elongated handle 23 which is pivoted at 24 upon a bracket comprising a pair of spaced rigid sides 26 which are riveted to the top of the exhaust passageway 16 within the normal confines of the motor housing 8.

To permit of the angular movement of the pivoted handle 23, and also to retain it in certain angular positions, there is provided a spring-pressed roller detent 28, the carrier or shaft 29 of which is slidingly carried by a bracket 31 on the handle 23. A coil spring 32 exerts a downward force upon the shaft 29 being positioned between one side of the bracket 31 and a pin 33 carried by the shaft. Cooperating with the roller detent is a sector 36 which may be formed integrally with a bracket side 26 and fixed to the top of exhaust passageway 16. Sector 36 is formed along its edge, which is concentric with handle pivotal axis 24, with a plurality of spaced seats 37 adapted resistingly to retain the roller detent 28 and so the handle 23. As illustrated the two end seats 37 represent the vertical and the horizontal positions of the handle while the central seat 37 represents the lower end of the working range of the handle. Between the seats 37 the roller detent is free to move along the arcuate surface of sector 36, the pivotal movement of the handle being unencumbered. With the roller detent 28 positioned in one of the seats 37 the handle can be pivoted by the exertion of a sufficient force thereon to effect the displacement of the detent against the force exerted by the coil spring 32. Obviously with the handle in either of the end positions pivotal movement is possible only towards the mid-position. If the operator stores the machine the roller detent 28 will seat in a seat 37 with the handle in a vertical position. If the operator lets go of the handle within its working range the handle pivots until the detent 28 seats within the central seat 37 where it is resistingly retained. At any time the operator lets go of the handle, the handle automatically pivots under its own weight, supplemented by whatever weight is exerted by virtue of the attachment of the upper end of the cleaner bag thereto, a normal relationship in the cleaner construction, to a position in which the detent 28 seats in a seat 37.

The surface of the sector 36 connecting the seats 37 lies on a circle having the handle pivot 24 as its center. Accordingly, the seating of the roller detent 28 in a seat 37 results in the downward longitudinal movement of the detent shaft 29 relative to the cleaner handle. In no case would the cleaner handle remain with the detent in a seat 37, that is, in an "at rest" position, during actual use of the cleaner by the operator and, accordingly, it is conclusively presumed that the operator is not using the machine whenever that relationship exists. Furthermore, it is desirable to de-energize the cleaner should it remain unattended for a predetermined time interval, that is, should the handle remain for that predetermined time interval in an "at rest" position. To effect this result the mechanism now to be described is provided.

A two-position snap-acting switch 41 is mounted interiorly of the handle 23 with its operating lever 42 positioned as to be contacted by an arm 43 secured to the end of the detent shaft 29. With the handle 23 in an operating position, that is, in an angular position in which the detent 28 is not positioned in a seat 37, the shaft 29 is advanced upwardly in the cleaner handle and the arm 43 has pivoted the lever 42 of the switch 41 into the "closed" switch position, as illustrated in Figure 3. Should the handle move from the position illustrated in Figure 3, that is, an operating position, to an "at rest" position, that is, a position in which the detent 28 is positioned in a seat 37, and as illustrated in Figure 4, then the downward advance of the detent shaft 29 and the arm 43 moves the latter from the switch lever 42 to the position illustrated in Figure 4.

Positioned within the cleaner handle 23 above the switch 41 is a spring-actuated expansible bellows 46 carried by a U-shaped bracket 47. Bellows 46 may be of any well known type but as disclosed comprises a resilient expansible body 48, the fixed upper end of which is clamped to an arm of the bracket 47 by a suitable sleeve 49 and a nut 51. The movable lower end of the bellows is clamped between a pair of nuts 53 and 54 and screw threaded upon a shaft 56 which is itself slidably supported in the sleeve 49 and in an aperture 57 in the spaced arm of the bracket 47. The end of shaft 56 carries an arm 58 which is adapted to contact the operating lever 42 of the switch 41 upon its side opposite to that contacted by the arm 43 carried by the detent shaft 29. A force exerted by the arm 58 upon the switch lever 42 tends to move the latter to "open" the switch.

Within bellows 46 and encircling the shaft 56 is a coil spring 59 which exerts an expanding force between the sleeve 49 and the nut 53 which at all times tends to expand the bellows and to move the shaft 56 and its attached arm 58 downwardly in the handle to "open" switch 41. Spring 59 does not exert a sufficient force to prevent the collapse of bellows 46 under the force exerted by the detent-actuated arm 43, which force passes through the switch member 42 to the bellows shaft-connected arm 58 when the detent moves from the position illustrated in Figure 1 to the position illustrated in Figure 3, a change which takes place when the handle pivots from an "at rest" position to an operative position. When not compressed by the detent, as described, the bellows 46 tends to expand under the force exerted by the coil spring 59 and at a rate which is determined by the rate of air flow into the bellows through the reduced intake vent 52 in the sleeve 49. The size of the intake vent 52 controls the time period required for the expansion of the bellows 46. As it is the bellows-moved arm 58 which moves the switch 41 from "closed" to "open" position it directly follows that the delay period in opening the switch 41 is directly dependent upon the operating characteristic of the bellows 46. The time delay in the actuation of the switch after the bellows starts to expand, which as stated coincides with the movement of the cleaner handle into an "at rest" position, is a matter of design but preferably is a period of from five to thirty seconds duration.

While it is necessary that the bellows 46 opens or expands with a delayed action it is just as important that it be capable of immediate collapse. To provide this characteristic there is provided a spring-urged ball valve 62 which is held by a coil spring 63 in closing relationship to an air passageway 64 which extends through the shaft 56 into the interior of the bellows body 48. An externally threaded nut 66 provides an abutment for the spring 63 which at all times urges the ball valve 62 into closing position. Upon the exertion of a collapsing force sufficient to overcome spring 59, such as a pressure exerted by the detent 28 in moving out of a seat 37, through the arm 43 and the switch lever 42, the pressure of the air within the bellows is increased and the valve 62 is forced to open position permitting the rapid collapse of the bellows. This occurs when the cleaner handle moves from the position illustrated in Figure 1 to that illustrated in Figure 3.

Turning now to Figure 2 the electrical circuit of the described embodiment is illustrated. Incoming current enters by the conductors 66 and 67. Lead 67 connects to a three-position switch 68 which is positioned usually at the upper end of the cleaner handle and which includes an operating lever 69 by which a movable contact 71 may be positioned as to direct current either through leads 72 or 73 to a handle socket 74 to which the other incoming lead 66 connects directly. Socket 74 seats a removable plug 76, the function of the plug and socket being to enable the handle to be disconnected at a suitable point within its length for assembly and shipping purposes. From the plug 76 the leads 66, 72 and 73 are continued as leads 77, 78 and 79, respectively. Leads 77 and 78 pass directly to the terminals of the motor M which is positioned within the motor housing 8 in Figure 1. Lead 79, however, passes to the aforedescribed handle-position-controlled switch 41 which includes the operating lever 42 and, as well, a movable contact 81. From the opposite side of the switch 41 a lead 82 connects to the same side of the motor as does the lead 78.

The operation of the cleaner constructed in accordance with this first embodiment of the invention is as follows: The operator removes the machine from its place of storage and connects it to a source of current at the leads 66 and 67. If he intends to use the machine in on-the-floor cleaning he moves the operating lever 69 of the switch 68 so as to position the movable contact 71 in contact with the lead 73 which passes current to the handle-position-controlled switch 41. If he intends to use the machine in off-the-floor cleaning, that is, with dusting tools, he would position the operating lever 69 so as to move the contact 71 into contact with the lead 72 so that current would pass directly to the motor through the lead 78. When so related the operation of the machine is independent of switch 41 and so of handle position.

Let us assume, however, that on-the-floor cleaner operation is intended and, accordingly, the operator will position the handle-operating lever 69 of the switch 68 so as to pass current through lead 73, plug and socket 74, 76 and lead 79 into switch 41. From there it passes through the lead 82, through the motor and back to the incoming power source through the lead 77, plug and socket connection 74, 76 to the lead 66. Having so positioned the handle switch with the machine inactive and, let us assume with the handle positioned in an "at rest" position, as illustrated in Figure 1, the operator then pivots the handle to an operating position, as illustrated in Figure 3. Immediately the switch 41 is closed by the upward movement of the detent and its shaft 29 which transmits its movement through the arm 41 to the switch-operating lever 42. Lever 42 in turn transmits its movement through the arm 58 to the shaft 56 of the bellows 46 which is compressed, the air therein escaping through the air passageway 64 and past the ball valve 62 which has been moved to open position by the air pressure. As long as the operator continues to operate the machine and does not permit the handle to return to an "at rest" position the cleaner motor will drive the suction-creating fan and the agitator 14 within the nozzle to effect cleaning.

Let it be assumed further that the operator leaves the machine while the handle is within its working range so that under its own weight it moves from a position such as that illustrated in Figure 3 to an "at rest" position as illustrated in Figure 4. Upon the detent 28 being seated within the seat 37, the shaft-carried arm 43 has moved from the switch lever 42. The latter is now no longer capable of holding the bellows 46 compressed and the coil spring 59 therein starts to expand the bellows at a rate which is determined by the speed with which air can enter through the intake vent 52. If the operator is away from the machine for the predetermined period the bellows will expand sufficiently to enable the shaft 56 and attached arm 58 to move the operating lever 42 with a snap action from the "closed" position illustrated in Figure 4 to the "open" position illustrated in Figure 1. Should the operator return to the machine before the end of the predetermined period the movement of the handle from the "at rest" position would cause the detent to collapse the bellows immediately without the switch being "opened." Whether the cleaner is de-energized or not is seen to depend entirely upon how long the operator permits it to remain unattended. Upon returning to the machine at any time, however, the operator need only pivot the handle from its "at rest" position, illustrated in Figure 1, to its operating position, illustrated in Figure 3, to place the machine in operation.

Referring now to Figures 7 to 10, inclusive, the second preferred embodiment of the invention is illustrated. This embodiment is basically similar to the first-described embodiment with the difference that the time delay period is provided by a heat-responsive unit rather than by an expansible pressure-responsive element. The cleaner proper is the same as in the first embodiment and will not be re-described. The cleaner handle 23 is again pivoted upon its axis 24 carried by a bracket comprising spaced walls, one of which is indicated at 26. In the present embodiment, however, the sector corresponding to the sector 36 of the first embodiment is indicated by the reference character 80 and is seen to be formed upon the lower edge of the side wall of the handle itself, the "at rest" seats being indicated at 83. The reversal of parts necessarily includes the mounting of the spring-pressed detent, here indicated at 84, upon the cleaner body, the detent shaft 86 extending slidably through the top wall 87 of the cleaner body. A coil spring 88 encircles the shaft 86 and exerts a force between the wall 87 and an enlarged shoulder 89 on the detent shaft 86 to urge the detent 84 into contact with the sector at all times. A cover plate 90 is fixedly secured to the top wall 87 of the casing to house the spring 88 and to provide additional guide means for the detent shaft 86.

As in the first embodiment it is the seating of the handle-position-controlling detent in the recessed seats of the cooperating sector which initiates the running of the time delay mechanism which, if permitted to run out its full period, results in the de-energization of the cleaner. In the present embodiment the seating of the detent causes the movement of its shaft 86 and the closing of a microswitch 91, the operating contact 92 of which is forced inwardly by an arm 93 carried by shaft 86. Microswitch 91 includes a movable contact 94, as shown in the diagrammatic showing of Figure 10, and which is connected by leads 96 and 97 in series with a heating coil 98.

Figure 10:
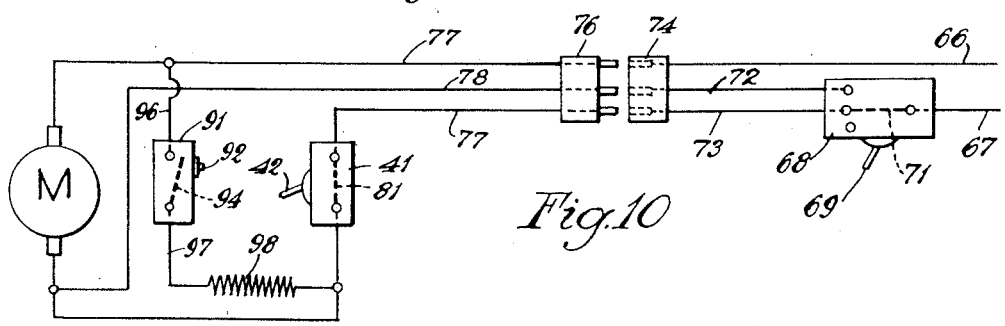
Figure 10 is a diagrammatic illustration of the electrical circuit of the cleaner constructed in accordance with the second embodiment of the invention.

The electrical connection of this embodiment of the invention is substantially identical to that first described and the description will not be repeated, it being only necessary to point out that the microswitch 91 and the heating coil 98 are connected in series between the leads 77 and 79 which are the conductors through which current flows in the on-the-floor cleaning operation of the machine, that is, when the handle switch 68 is positioned as illustrated in Figure 10.

Figure 9:
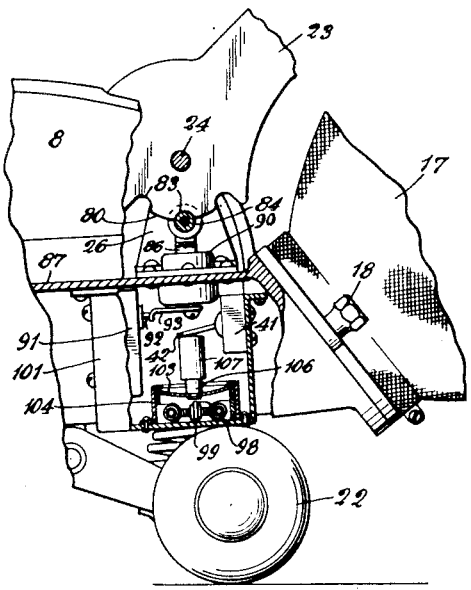
Figure 9 is a view similar to Figure 8 but with the cleaner handle returned to an "at rest" position, the control parts being shown in their positions during the time delay period immediately preceding the de-energization of the cleaner.

The heating coils 98 are suitably mounted upon insulators 99 on the bottom of a housing 101 secured on the underside of the casing wall 87. Supported by a cylindrical collar 104 on the housing floor and positioned immediately above the coils in heat-receptive relationship thereto is a heat-responsive element 103 of the type commonly known as a Spencer disc. When cool element 103 normally is flexed downwardly, as illustrated in Figure 9, but when heated by the coil 98 deflects upwardly to assume the position illustrated in Figure 7.

Mounted centrally of the heat-responsive element 103 and extended vertically therefrom is a post 106 upon the top of which is mounted a compressible cup 107 which is normally spring urged to its outermost position, as determined by the pin and slot connection 108, by a coil spring 109. The post 106 is positioned substantially directly under the detent shaft 86 and the switch 41, described in the first embodiment, is positioned therebetween and is so arranged that its lever 42 is adapted to be contacted upon opposite sides thereby.

The operation of this second embodiment of the invention is as follows: It is assumed that the operator has positioned the operating switch 68 for on-the-floor operation and current flows to the cleaner motor via leads 66 and 73 and the circuit includes the switch 41 which in the present embodiment is controlled by the heat-responsive unit rather than by a pressure-responsive unit as in the first embodiment. At the outset let it be assumed that the machine handle is in an "at rest" position, as illustrated in Figure 9. Heat-responsive element 103 is in its cold, downwardly deflected position and the microswitch 91 is held closed by the arm 93 on the detent shaft 86 with the detent 84 seating in the sector seat 83. The cleaner motor is energized upon the closing of the handle switch 68 and operates with the cleaner standing. Immediately current begins to flow through the heating coil 98. Thereafter, and at the end of the time period required for the heat-responsive element to flex, and this period may be predetermined by the manufacturer, the heat-responsive element 103 flexes from the position illustrated in Figure 9 to that illustrated in Figure 7. This movement of the heat-responsive element upwardly causes the element-actuated cap 107 to contact the switch lever 42 and to pivot the switch 41 to the "open" position thereby cutting off the flow of current to the motor. Immediately the current is cut off by the opening of the switch 41 the cleaner is de-energized, the heating coil cools and the heat-responsive element 103 returns to its original position as illustrated in Figure 9.

Figure 8:
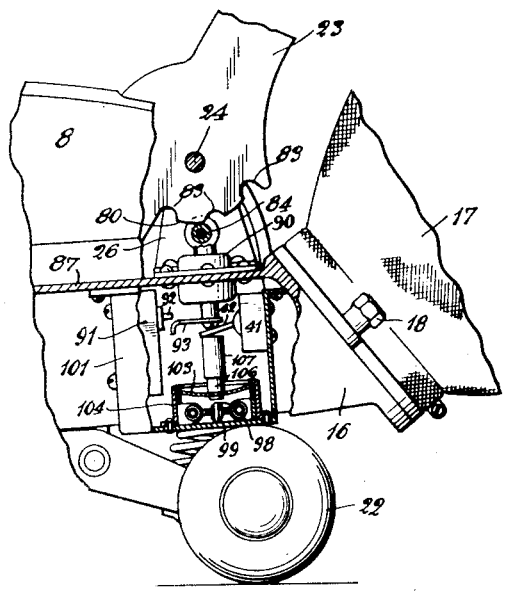
Figure 8 is a view similar to Figure 7 with the cleaner handle in an operating position and the control parts positioned for cleaner operation.
Figure 7:
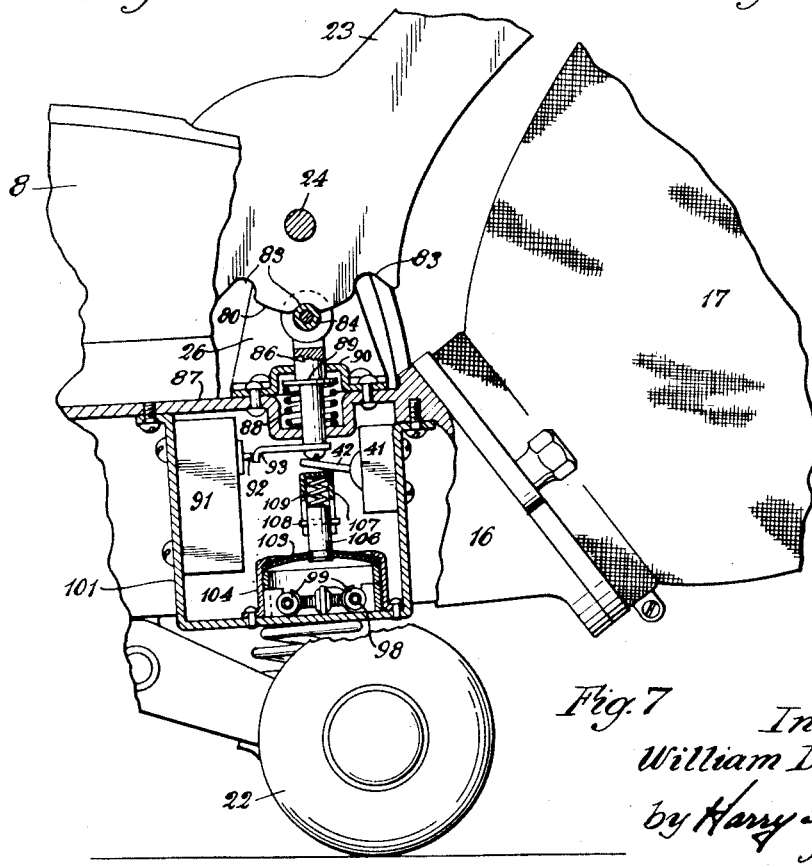
Figure 7 is a partial vertical section through a cleaner constructed in accordance with a second preferred embodiment of the invention in which the time delay mechanism comprises heat-responsive means, the handle being shown in an "at rest" position and the automatic control parts being related to de-energize the cleaner.
Figure 11:
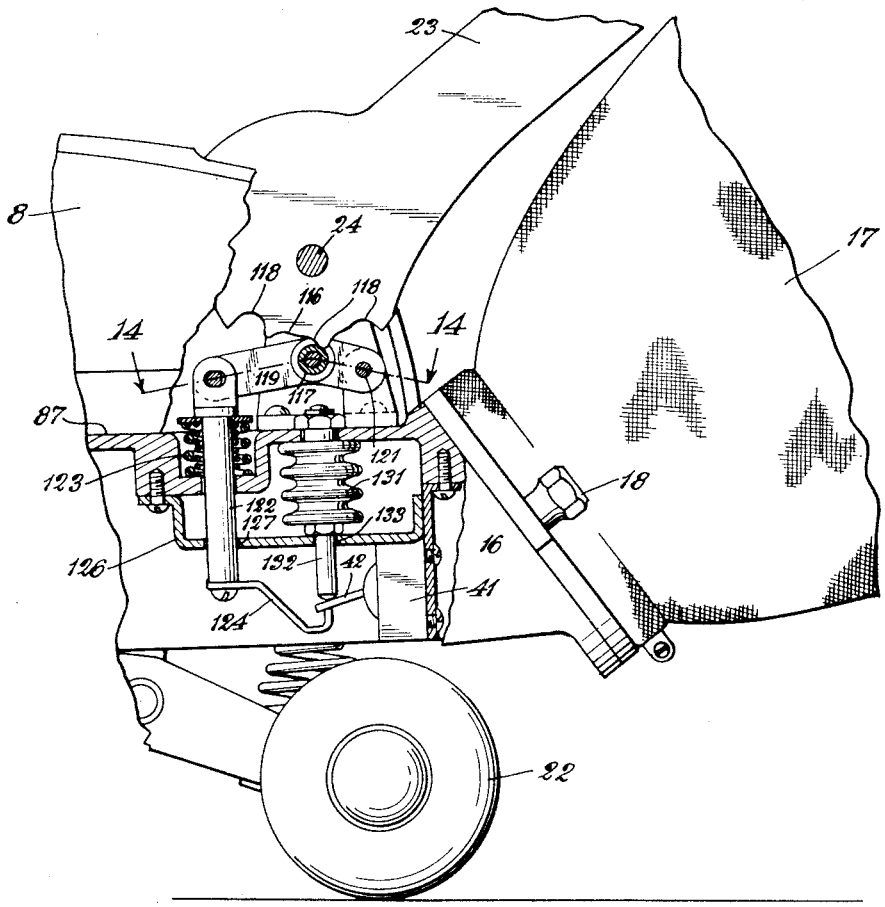
Figure 11 is a partial vertical section through a cleaner constructed in accordance with a third preferred embodiment of the invention and shows the relationship of the control parts with the cleaner handle in an "at rest" position and with the cleaner de-energized.

Let it be further assumed that the operator, instead of permitting the handle to remain in an "at rest" position moves it from the position illustrated in Figure 7 to the position illustrated in Figure 8. In this handle movement the detent 84 moves from the "at rest" position in the seat 83 to an operating position as illustrated in Figure 8. Immediately the detent shaft 86 moves downwardly to contact and hold the operating lever 42 of the switch 41 in its "closed" position. As the detent shaft 86 moved downwardly the arm 93 carried thereby moved out of contact with the button 92 of the microswitch and the latter moves to its "open" position thereby cutting off the flow of current to the heating coil 98.

In a situation in which the operator returned to the machine after the heat-responsive element 103 had deflected to its upper position but before it had cooled sufficiently to return to its cold lower position some means is necessary to prevent injury to the element should the operator move the handle into an operating position. This possibility is cared for by the compressible cap 107 on the post 106. Should the operator move the handle into an operating range, thereby depressing downwardly the detent shaft 86 and before the heat-responsive element has reassumed its cold position, the resilience of the spring 109 permits the cap 107 to be forced downwardly without movement of the heat-responsive element 103 itself.

As in the first embodiment should the operator desire to use the machine in off-the-floor cleaning and independently of the position of the cleaner handle he can accomplish this result merely by positioning the operating lever 69 of the manually operable switch 68 so as to cause current to flow through the leads 72 and 78, through the motor and back through the leads 77 and 66.

Referring now to Figures 11 to 15, inclusive, the third preferred embodiment of the invention is illustrated and is seen to comprise something of a combination of the features of the first and second embodiments. The sector is found upon the cleaner handle, as in the second embodiment, with the spring-pressed detent carried by the cleaner, while from the first embodiment has been taken the pressure-operated bellows as the time delay mechanism. In the present instance, however, the bellows is mounted upon the cleaner body rather than upon the handle. So far as the electrical connection of the machine is concerned, a comparison of diagrammatic Figures 15 and 2 indicates that they are identical. The present embodiment has the advantage over the construction of Figure 1 in that the entire control mechanism can be mounted upon the cleaner body, it being necessary only to provide a handle-position-controlling sector on the handle itself.

The arcuate sector is indicated generally by the reference character 116 and the working surfaces thereof with which the detent 117 cooperates are seen to be defined by a plurality of raised shoulders 118 which may be said to define the "at rest" position of the handle for they are so contoured and so positioned that with the detent 117 in contact therewith the handle will not move past that angular position in the absence of an intentional greater-than-normal pivoting force. These abutments also are so shaped as to cause the detent to ride farther from the pivotal axis 24 of the handle before exerting a sufficient resistance force to prevent further movement of the handle.

In this embodiment the roller detent 117 is carried by an arm 119, one end of which is pivoted in a bracket 121 and the opposite end of which is pivoted to a vertical shaft 122 which is slidably mounted in the top wall 87 of the cleaner casing. The shaft 122 is spring urged upwardly by a coil spring 123 and at its lower end carries an arm 124 which extends under the operating lever 42 of the switch 41. A housing plate 126 is secured on the underside of the casing wall 87 and is apertured at 127 to provide a further guide for the detent shaft 122. Positioned within the housing formed by the plate 126 is an expansible bellows 131 which may be of the type illustrated and described in the first embodiment and which includes a downwardly extending shaft 132 which also extends slidingly through a guide aperture 133 in the wall 126. Bellows 131 has its upper end fixed to and supported in the casing wall 87, its lower end being fixed to the shaft 132. Bellows 131 expands downwardly with the shaft 132, moving with a time delay action as described in connection with the first embodiment, the movement of the shaft 132 against the lever 42 tending to open the switch 41. On the other hand the upward movement of the arm 124 connected to the detent 117 tends to move the switch lever 42 to close the switch.

Figure 12:
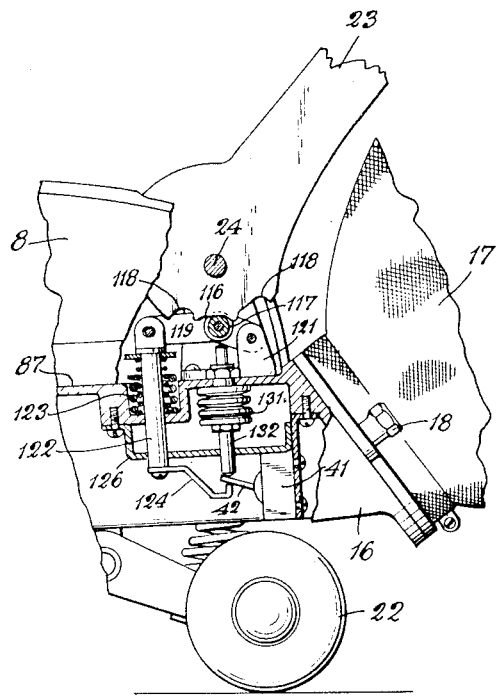
Figure 12 is a view similar to Figure 11 but with the control parts positioned for cleaner operation.

The operation of this third embodiment of the invention is as follows: With the cleaner in normal operation the parts are related as illustrated in Figure 12. The detent 117 rides upon an operating surface of the sector 116 and the switch lever 42 has been moved by the arm 124 to "closed" position and current flows through the driving motor of the cleaner. Should the operator let go of the handle under the weight of the cleaner handle and the bag it would move to the position illustrated in Figure 13. The contour of the abutment 118 is such as to prevent the travel therebeyond of the detent 117 but the weight of the handle and the parts connected thereto is sufficient to cause the detent to ride out on the abutment sufficiently to depress the shaft 122 and the arm 124 from the position of Figure 12 to that of Figure 13. Immediately the operating lever 42 of the switch 41 finds itself unsupported in its "closed" position and likewise immediately the bellows 131 begins to expand to move the shaft 122 downwardly in accordance with the principle as described in the first embodiment. After the predetermined time period has elapsed shaft 132 will have moved sufficiently far as to cause the switch-operating lever 42 to move with a snap action to "open" switch 41 whereupon the cleaner motor will be de-energized and the machine will remain inoperative.

Figure 13:
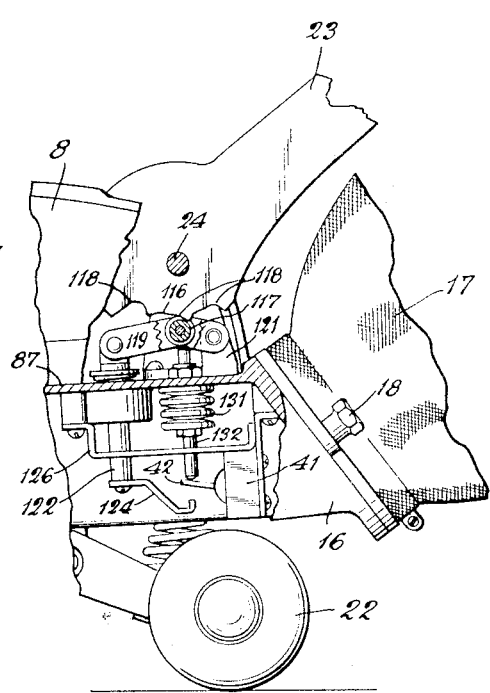
Figure 13 is a view similar to Figure 12 but with the control parts illustrated in their positions with the cleaner handle in an "at rest" position and during the time delay period immediately preceding cleaner de-energization.
Figure 14:
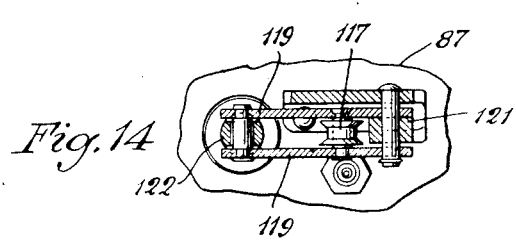
Figure 14 is a section upon the line 14—14 of Figure 11 and shows the mounting of the spring-pressed detent.
Figure 15:
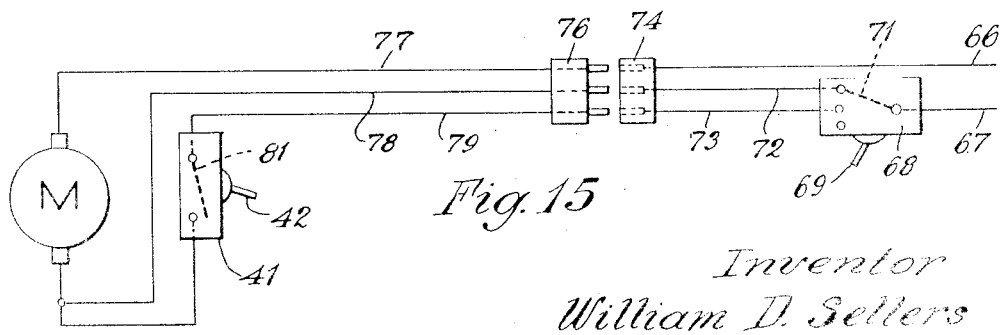
Figure 15 is a diagrammatical illustration of the electrical circuit of the cleaner connections in this third embodiment of the invention.

Upon the operator returning to the machine and moving the cleaner handle from the position of Figure 13 to that of Figure 12 the detent 117 immediately travels towards the pivotal axis of the cleaner handle, the coil spring 123 forces the shaft 122 upwardly together with the arm 124 which thereupon forces the operating lever 42 of the switch 41 upwardly to "close" the switch. The bellows 131 is collapsed instantly, the air rushing therefrom as the ball valve therein operates as described in the first embodiment.

In all the embodiments of the invention as described the machine automatically becomes inoperative only after remaining out of use for a predetermined time pediod. Additionally, the machine is instantaneously rendered operative upon the return of the operator to the machine and his resumption of the cleaning operation.

I claim:

1. The combination with a suction cleaner of the type having a body, a surface cleaning means in said body, an electric driving motor for said surface cleaning means, means movably supporting said body, a propelling handle pivotally connected to said body, means to retain said handle in a certain angular position relative to said body and an electrical circuit for energizing said motor, of means for energizing and de-energizing said electric driving motor upon movement of the propelling handle out of and into said certain position comprising a switch for controlling the electrical circuit for energizing said motor, time delay means operatively connected to said switch to open said switch to de-energize said motor after a predetermined time interval with said handle in said certain position, and means operatively connected to said handle and to said switch to close said switch to energize said motor immediately upon said handle being moved from said certain position.

2. The combination with a suction cleaner of the type having a body, a surface cleaning means in said body, an electric driving motor for said surface cleaning means, means movably supporting said body, a propelling handle pivotally connected to said body, cooperating means on said handle and on said body to retain said handle in a certain angular position relative to said body including a movable element adapted to move in a predetermined manner with said handle moving into and from said position, and an electrical circuit for energizing said motor, of means for energizing and de-energizing said electric driving motor upon movement of the propelling handle out of and into said certain position comprising a switch fcr controlling the electrical circuit for energizing said motor, means movable by said movable element to close said switch immediately upon said handle moving from said certain position, and time delay means to open said switch a predetermined time interval after said handle has moved into said certain position.

3. The construction recited in claim 2 characterized in that said time delay means comprises a pressure-operated bellows having different opening and closing characteristics.

4. The construction recited in claim 2 characterized in that said movable element, said switch and said time delay means are all carried by said handle.

5. The construction recited in claim 2 characterized in that said movable element, said switch and said time delay means are all carried by said body.

6. The constructon recited by claim 2 characterized in that said time delay means comprises a heat-responsive unit the heating circuit of which is closed by the movement of said movable element.

7. The combination with a suction cleaner of the type having a body, a surface cleaning means in said body, an electric driving motor for said surface cleaning means, means movably supporting said body, a propelling handle pivotally connected to said body, means comprising a spring-pressed detent and a sector with a detent seat to retain said handle in a certain angular position relative to said body mounted on said body and on said handle, and an electrical circuit for energizing said motor, of means for energizing and de-energizing said electric driving motor upon movement of the propelling handle out of and into said certain position comprising a switch for controlling the electrical circuit for energizing said motor, means connected to said detent to close said switch to energize the motor upon the movement of said detent from its seat in said sector and time delay means to open said switch to de-energize the motor a predetermined time interval after said detent has moved into its seat on said sector.

8. The combination with a suction cleaner of the type having a body, a surface cleaning means in said body, an electric driving motor for said surface cleaning means, means movably supporting said body, a propelling handle pivotally connected to said body, means comprising a spring pressed detent and a sector with a detent seat mounted on said body and on said handle to retain said handle in a certain angular position relative to said body, and an electrical circuit for energizing said motor, of means for energizing and de-energizing said electric driving motor upon movement of said propelling handle out of and into said certain position comprising a switch for controlling the electrical circuit for energizing said motor, means connected to said detent and adapted to be operatively connected to said switch to close said switch to energize said motor upon movement of said detent from its seat in said sector, and time delay means comprising a slow opening, quick closing pressure-responsive bellows to open said switch to de-energize the motor a predetermined time interval after said detent seats in its seat in said sector, said bellows being adapted to collapse immediately upon the movement of said detent from said seat.

9. The combination with a suction cleaner of the type having a body, a surface cleaning means in said body, an electric driving motor for said surface cleaning means, means movably supporting said body, a propelling handle pivotally connected to said body, means comprising a spring pressed detent and a sector with a detent seat mounted on said body and on said handle to retain said handle in a certain angular position relative to said body, and an electrical circuit for energizing said motor, of means for energizing and de-energizing said electric driving motor upon movement of said propelling handle out of and into said certain position comprising a switch for controlling the electrical circuit for energizing said motor, means connected to said detent and adapted to be operatively connected to said switch to close said switch to energize said motor upon movement of said detent from its seat in said sector, and time delay means comprising a heat-responsive unit of the type having a heat-deflected element and a heating unit, to open said switch a predetermined time interval after said handle moves into said fixed position, and a second switch actuated by the movement of said detent into said seat to direct a flow of heating current through said heating unit.

10. In a suction cleaner, a body portion, a driving motor in said body portion, a propelling handle for the cleaner pivotally attached to said body portion for movement into and from cleaner operating and at rest positions, a lead connecting one side of said motor to a power source, a pair of leads in parallel connecting the other side of said motor to a manually operable switch, one of said pair of leads being connected in series with a handle-position-controlled switch to control the flow of current therethrough in on-the-floor cleaning including time delay means to open said switch in a predetermined time interval with the handle in its at-rest position, and a lead connecting said manually operable switch to a power source and adapted to be selectively connected by said switch to one of said leads in parallel, whereby in on-the-floor cleaning, with the manually operable switch connected in series with the handle-position-controlled switch, the suction cleaner is adapted to be energized for a predetermined period with the handle in its at-rest position and automatically de-energized if left with the handle in the aforesaid position longer than the aforesaid predetermined period, and upon movement of the handle into cleaner-operating position, the suction cleaner is adapted to be automatically re-energized; and with the manually operable switch connected with the other of said leads and disconnected from the aforesaid handle-position-controlled switch, the suction cleaner is adapted to be energized for off-the-floor cleaning.

11. In a suction cleaner of the type having a body, a suction-creating fan unit in said body, an electric driving motor for said fan unit, and means movably supporting said body; a propelling handle pivotally connected to said body, cooperating means on said body and on said handle to retain resistingly said handle in a certain angular position relative to said body and including a movable element, electric circuit means operative in response to the movement of said handle and adapted to energize and de-energize said motor depending upon the position of the handle comprising a switch controlling the flow of current through said motor and including an operating lever actuated in one direction by said element to close the switch, and a pressure-responsive bellows connected to said lever to move same to open the switch against the force exerted by said element, characterized in that upon the movement of said element attendant upon the movement of said handle into said certain angular position said bellows requires a predetermined time period to actuate said lever.

12. The combination with a suction cleaner of the type having a body, a suction-creating means and surface-agitating means in said body, an electric driving motor for driving said suction-creating means and surface-agitating means, a propelling handle pivotally connected to said body and adapted to be placed in a cleaner-operating position and an at-rest position, and an electrical circuit for energizing the motor, of means for energizing and de-energizing the suction-creating means and the surface-agitating means upon the movement of the propelling handle in and out of cleaner-operating and at-rest positions comprising cooperating means on said handle and on said body to retain said handle in a certain angular position relative to said body including a movable element adapted to move in a predetermined manner with said handle moving into and from said position, a switch operatively connected to the movable element for controlling the electrical circuit for energizing the motor, means movable by said movable element to close said switch immediately upon said handle moving from said position, and time delay means operatively connected to the aforesaid switch and to the aforesaid movable element to open said switch a predetermined time interval after said handle has moved into said position, whereby the suction-creating means and the surface-agitating means are de-energized after a predetermined time interval upon the propelling handle being positioned in its at-rest position and energized upon the propelling handle being repositioned in its cleaner-operating position.

13. The combination with a suction cleaner adapted to be energized, de-energized and re-energized in its cleaner-operating and at-rest positions, said cleaner having a body, an operator-operable handle pivotally connected to said body and adapted to be placed in a cleaner-operating position for propelling the cleaner and in an at-rest position automatically as the handle pivots under its own weight upon release by the operator, of means for energizing and de-energizing the suction cleaner upon the movement of the handle into and out of cleaner-operating and at-rest positions comprising control means adapted for energizing and de-energizing the suction cleaner, means including a movable element to retain said handle in a certain angular position relative to said body in an at-rest position, time delay means operatively connected to the aforesaid control means and to the movable element to actuate said control means to de-energize the cleaner after a predetermined time interval with said handle automatically placed in said position, and means to actuate said control means to energize the cleaner upon said operator-operable handle being moved manually from said position, whereby the suction cleaner is adapted to be energized for a limited period with the handle in its at-rest position and automatically de-energized if left with the handle in the aforesaid position longer than the aforesaid limited period, and upon movement of the handle into cleaner-operating position, the suction cleaner is adapted to be automatically re-energized.

14. The combination with an electrically operated suction cleaner of the type having a body, means movably supporting said body, a propelling handle attached to the body for movement into and from cleaner operating and at-rest positions, cooperating means on said handle and on said cleaner to retain said handle in a certain angular position relative to said cleaner including a movable element adapted to move in a predetermined manner with said handle moving into and from said position, and an electrical circuit for energizing said motor, of means for energizing and de-energizing said cleaner upon movement of said propelling handle out of and into said at-rest position comprising a switch controlling the energization and de-energization of said suction cleaner, means movable by said movable element to close said switch immediately upon said handle moving from said position, and time delay means to open said switch a predetermined time interval after said handle has moved into said position, whereby with the handle in its at-rest position the suction cleaner is energized for a predetermined period and upon expiration of that period automatically de-energized and upon movement of the handle to its cleaner-operating position, the suction cleaner is automatically re-energized.

15. The combination with an electrically operated suction cleaner of the type having a body, means movably supporting said body, a propelling handle attached to the body for movement into and from cleaner operating and at-rest positions, cooperating means on said handle and on said cleaner to retain said handle in a certain angular position relative to said cleaner including a movable element adapted to move in a predetermined manner with said handle moving into and from said position, and an electrical circuit for energizing said motor, of means for energizing and de-energizing said cleaner upon movement of said propelling handle out of and into said at-rest position comprising a switch controlling the energization and de-energization of said suction cleaner, means movable by said movable element to close said switch immediately upon said handle moving from said position, time delay means to open said switch a predetermined time interval after said handle has moved into said position, and said time delay means comprising a heat-responsive unit the heating means of which is actuated by the movement of said movable element, whereby with the handle in its rest position the suction cleaner is energized for a predetermined period and upon expiration of that period automatically de-energized and upon movement of the handle to its cleaner-operating position, the suction cleaner is automatically re-energized.

WILLIAM D. SELLERS.

REFERENCES CITED

The following references are of record in the file of this patent:

UNITED STATES PATENTS

| Number | Name | Date |
| --- | --- | --- |
| 974,480 | Foster | Nov. 1, 1910 |
| 1,119,967 | Landsiedel | Dec. 8, 1914 |
| 1,167,132 | Teetor | Jan. 4, 1916 |
| 1,192,949 | Spangler | Aug. 1, 1916 |
| 1,270,845 | Landsiedel | July 2, 1918 |
| 1,310,965 | Rinsche | July 22, 1919 |
| 1,356,663 | Spielman | Oct. 26, 1920 |
| 1,507,922 | Liedl | Sept. 9, 1924 |
| 1,642,518 | Throop | Sept. 13, 1927 |
| 1,942,040 | Wolff | Jan. 2, 1934 |
| 2,093,419 | Coleman | Sept. 21, 1937 |
| 2,148,656 | Smellie | Feb. 28, 1939 |
| 2,323,554 | Mason | July 6, 1943 |
| 2,343,732 | Baird | Mar. 7, 1944 |